United States Patent [19]

Hawkins

[11] Patent Number: 4,981,201

[45] Date of Patent: Jan. 1, 1991

[54] VARIABLE DRIVE APPARATUS

[75] Inventor: Dale A. Hawkins, Loma Mar, Calif.

[73] Assignee: Paul D. Asmus, Woodside, Calif.

[21] Appl. No.: 231,713

[22] Filed: Aug. 12, 1988

[51] Int. Cl.⁵ .............................................. F16D 31/00
[52] U.S. Cl. .................................... 192/58 R; 192/59;
192/60; 192/61; 60/487; 60/489
[58] Field of Search ................... 192/58 R, 59, 60, 61;
60/489

[56]     References Cited
U.S. PATENT DOCUMENTS

| | | | |
|---|---|---|---|
| 881,444 | 3/1908 | Schlachter | 192/58 R |
| 1,099,161 | 6/1914 | Brown | 192/58 R |
| 1,474,971 | 11/1923 | Kramer | 192/58 R |
| 1,596,062 | 8/1926 | Meyers | 192/59 |
| 1,787,246 | 12/1930 | Greeninu et al. | 192/59 |
| 1,825,435 | 9/1931 | Wingquist | 192/58 R |
| 1,904,811 | 4/1933 | Zahn | 192/58 R |
| 1,972,602 | 9/1934 | Robbins | 192/58 R |
| 2,065,737 | 12/1936 | Ramsey | 192/61 |
| 2,221,308 | 11/1940 | Dischert | 60/489 |
| 2,589,362 | 3/1952 | Foster | 60/49 |
| 2,645,901 | 7/1953 | Elkins | 60/489 |
| 2,737,020 | 3/1956 | Berry | 60/489 |
| 3,208,570 | 9/1965 | Ashauer | 192/58 R |
| 4,078,453 | 3/1978 | Brace | 192/61 |
| 4,109,466 | 8/1978 | Keech | 60/487 |
| 4,696,148 | 9/1987 | Brace | 60/489 |

Primary Examiner—Rodney H. Bonck
Assistant Examiner—Nicholas Whitelaw
Attorney, Agent, or Firm—Townsend and Townsend

[57] ABSTRACT

An infinitely variable high efficiency drive mechanism that can act as a transmission or as a coupling between a prime mover and the reducing gears of a standard or automatic transmission, replacing a clutch or torque converter as a means of power transmission. This mechanism includes a hydraulic pump with a self-contained valve that keeps high pressure oil flow to a minimal distance. It can regulate shaft output torque ratio from zero (neutral) to 1:1 in locked position with minimal efficiency losses.

10 Claims, 5 Drawing Sheets

VARIABLE DRIVE APPARATUS

FIELD OF THE INVENTION

This invention relates to improvements in mechanical transmissions suitable for many different uses, including use with a vehicle or stationary drive systems and is especially amenable to control by a precession microprocessor.

BACKGROUND OF THE INVENTION

Transmissions of different types have been developed over the years to provide greater control of mechanical loads, such as the driving wheels of power vehicles. For the most part, such transmissions, because of their complexity, have not proven to be fully efficient in providing a practical means to transfer the power of a power source to a load for operating the load in a wholly efficient manner. In all automotive transmissions, it is desirable to enable a vehicle, for instance, to accelerate to a maximum through a wide speed range, while the engine of the vehicle operates within its most efficient torque output range.

It is also desirable to have no limitations as to power input applied to the transmission and power output obtained from the transmission. An improvement in fuel economy would be a very beneficial result of a well designed transmission. Also, reduction of air pollution is a desirable aim to be considered in the design of transmissions. It is also especially preferable to provide, for a transmission design, a power source having a drive shaft with a constant output speed, such as the drive shafts of motors, turbines and the like. Moreover, it is desirable to have a smooth transition through the various shift points so as to reduce wear and tear on the mechanical components of the system. If a transmission can be operated under the influence of a microprocessor, greater control of the transmission can be achieved than has heretofore been capable.

The primary object of the present invention is to provide an improved transmission apparatus which is of the variable ratio type and which can be easily controlled, such as by a microprocessor, through the various shift points without noticeable changes in acceleration or engine speed yet the apparatus is simple and rugged in construction, is made of a relatively few number of parts and is inexpensive to produce and maintain.

Other objects of this invention will become apparent as the following specification progresses, reference being made to the accompanying drawings for an illustration of the invention.

DESCRIPTION OF THE DRAWINGS

Control piston 12 as shown in FIG. 2 is cylindrical and is slidably received within a central bore of valve body 5. A coil spring 13 at one end of control piston 12 biases the control piston to the left when viewing FIG. 1. In such position, two axially spaced, annular recesses in the outer surface of control piston 12 mate with suction (S) and discharge (D) portions of a fluid passage through valve body 5. FIG. 2 shows that the recesses are in full fluid communication with respective suction (S) and discharge (D) portions of the fluid passage.

A recess 22 at the left-hand side of control piston 12 when viewing FIG. 2 is provided to receive a variable pressure fluid from passage 20. The pressure of the fluid from passage 20 forces the control piston 12 to the right against the bias force of spring 13 to partially or fully close the annular recesses in the outer surface of the control piston 12. When the recesses are fully blocked, i.e., closed, shaft 1 is rigidly connected to shaft 26. When the recesses are partially blocked, shaft 26 rotates at a fraction of the speed of rotation of shaft 1.

DETAILED DESCRIPTION

Figure 1:
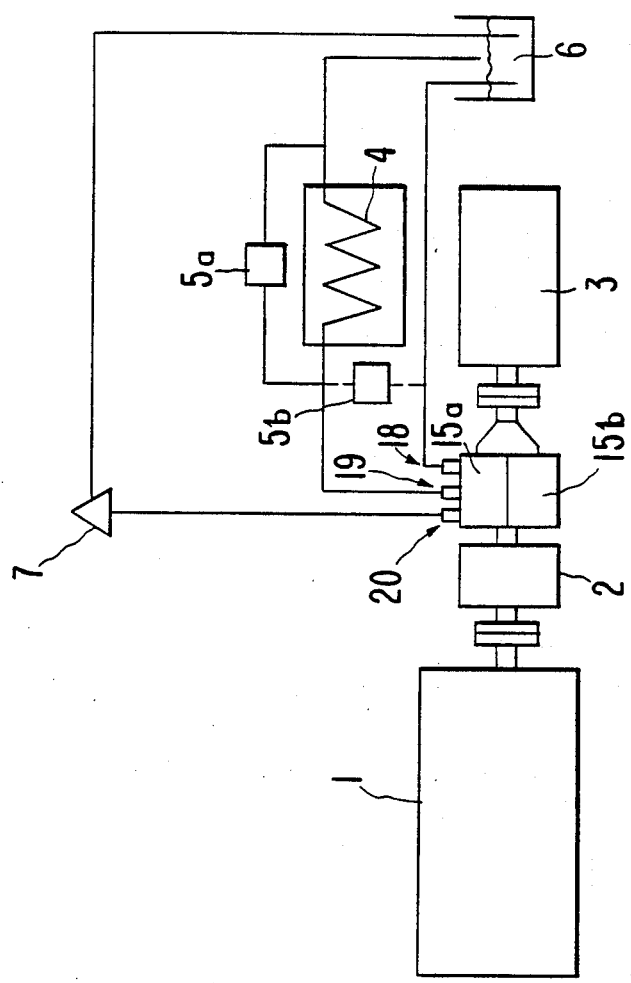
FIG. 1 is a schematic side view of a first embodiment of the transmission apparatus of the present invention.
Figure 2:
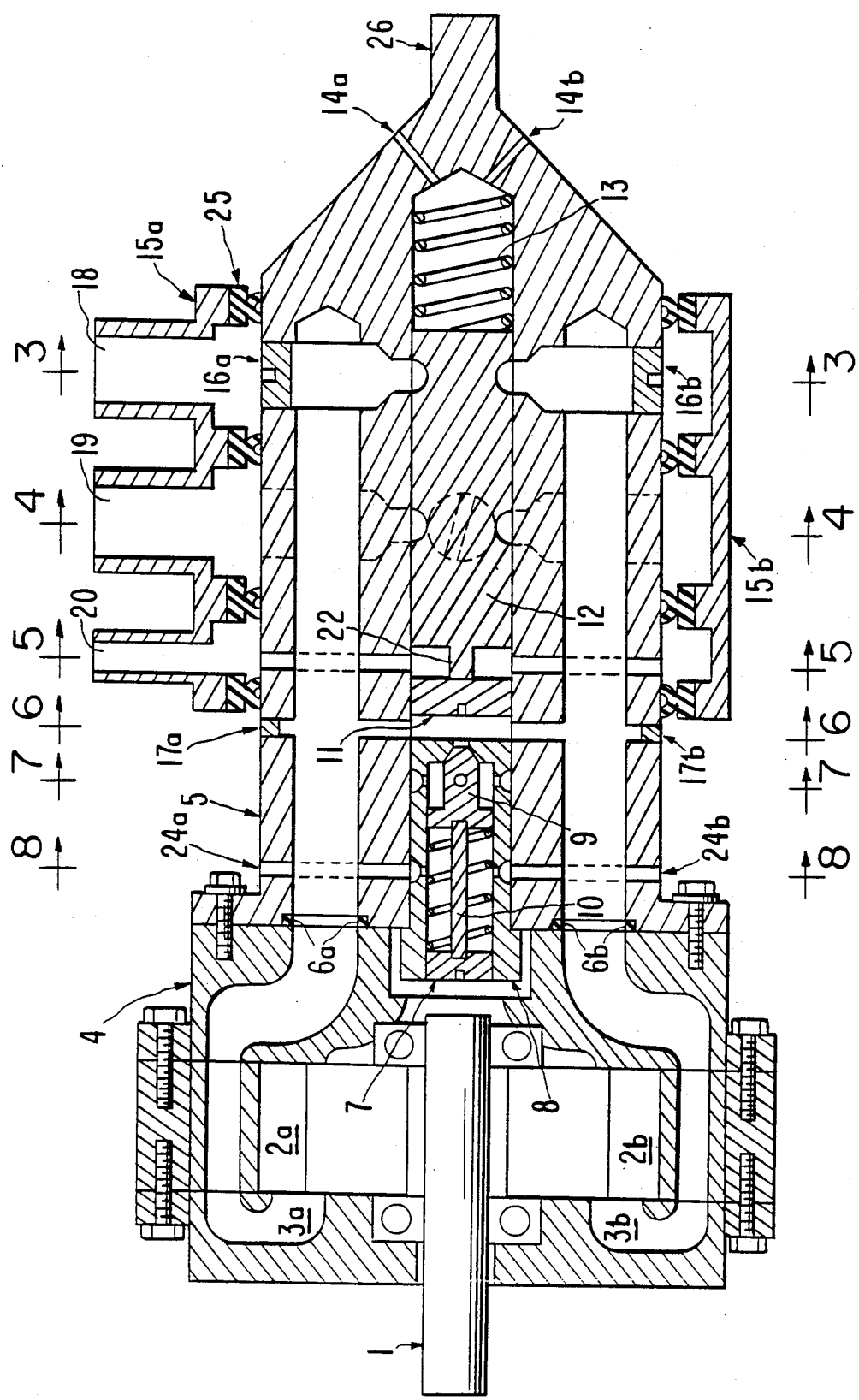
FIG. 2 is an enlarged vertical sectional view of the apparatus unit suitable for use with the present invention.
Figure 3:
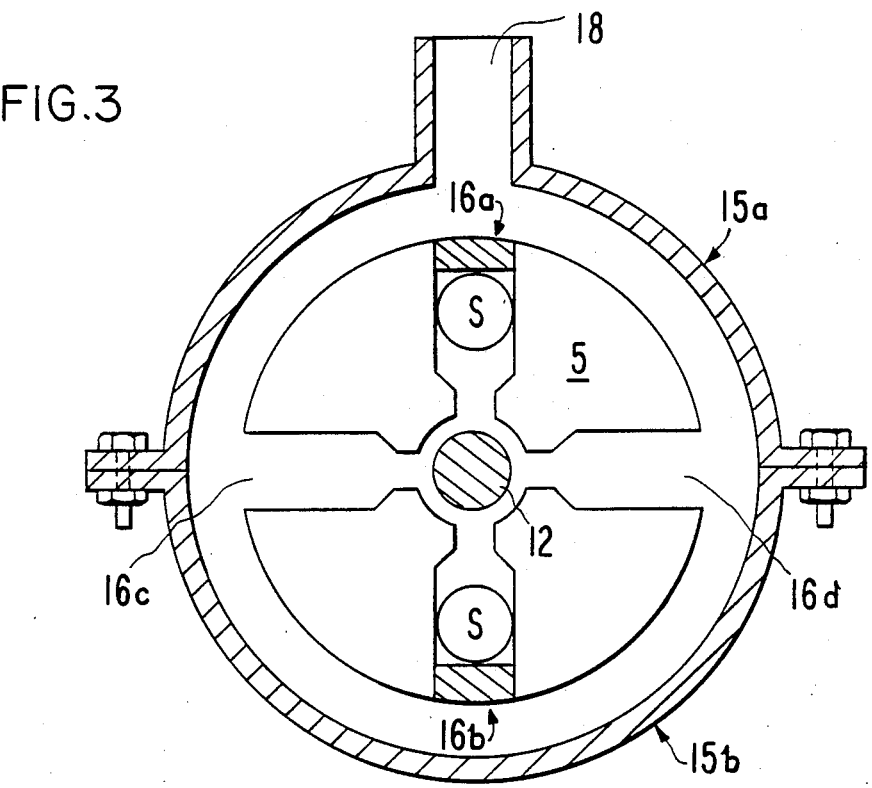
FIG. 3 is a sectional view taken along line A—A of FIG. 2.

The embodiment of the transmission apparatus of the present invention is broadly shown in FIGS. 1 and 2.

In FIG. 1 the numeral 1 denotes the engine, or drive motor which couples to the generator, or whatever power equipment is desired. Pump 2 is rotatable while upper housing 15a and lower housing 16b remains stationary under all situations. Discharge 19 sends hydraulic oil to the reservoir 6 via the radiator 4 or the thermal by-pass 5a and/or alternate thermal by-pass 5b. Suction 18 brings hydraulic oil from the reservoir or fluid supply 6. Pressure regulator 7 regulates the control piston 12 contained within the valve body 5 of FIG. 2. Control valve 7 can be either hydraulic (as shown) or pneumatic and/or electrically operated.

Rotational torque is applied to the input shaft 1 of FIG. 2. FIGS. 2a and 2b represent a standard balanced vane hydraulic pump enclosed within a specially designed housing which directs the discharge towards the rear at 180° apart while the suction is also 180 apart and 90° from the discharge though more than four passageways can be used.

In FIG. 2 valve body or elongated member 5 connects to the back of the pump body 4. The four passageways are sealed with O-ring seals 6a, 6b, 6c and 6d (6c and 6d not shown). The valve body contains the passageways, relief valve 7, 8, 9 and 10 and the control piston 12. The valve body 5 rotates about a central axis and has an output shaft 26 coextensive with such central axis valve body 5 and the output shaft 26 being rigidly affixed.

In the same figure the non-rotational housing 15a and 15b contain the seals 25 as well as the discharge port 19, suction port 18 and regulation orifice 20.

Figure 4:
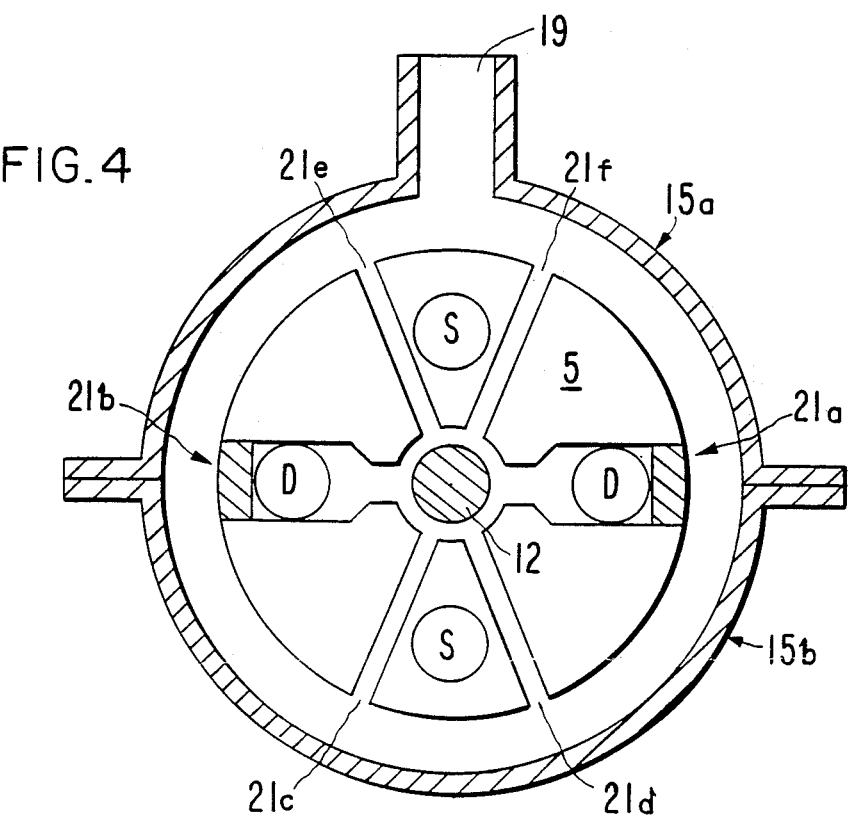
FIG. 4 is a sectional view taken along line B—B of FIG. 2.

In a typical operation where there is an input torque applied to the input shaft 1 to operate the pump, and the output shaft 26 is held stationary, hydraulic oil begins to circulate through the passageways and the discharge side D of control piston 12 (FIG. 4), out the discharge port 19 through the radiator 4, or thermal bypass 5, to the reservoir 6. From there the suction draws hydraulic oil back through suction port 18 through the suction sides of control piston 12 and through the passageways D and S back to the suction side of the pump in a continuous loop.

Figure 5:
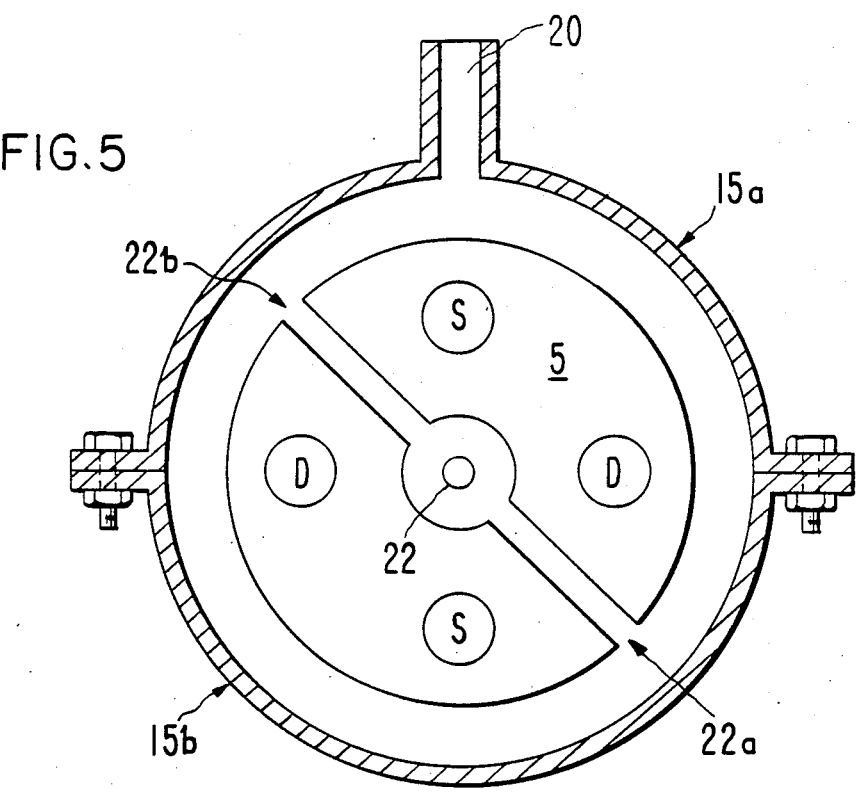
FIGS. 5-8 are sectional views taken along lines C—C, D—D, E—E and F—F, respectively, of FIG. 2.
Figure 6:
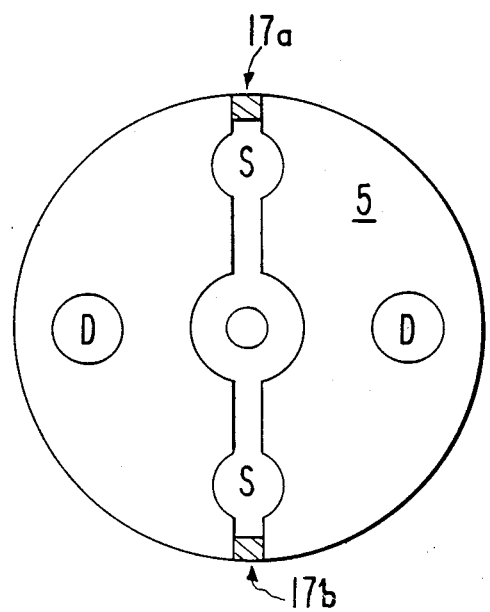
Figure 7:
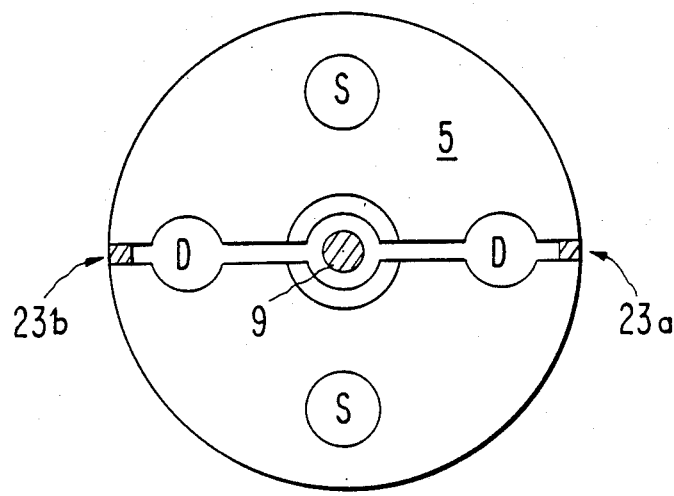
Figure 8:
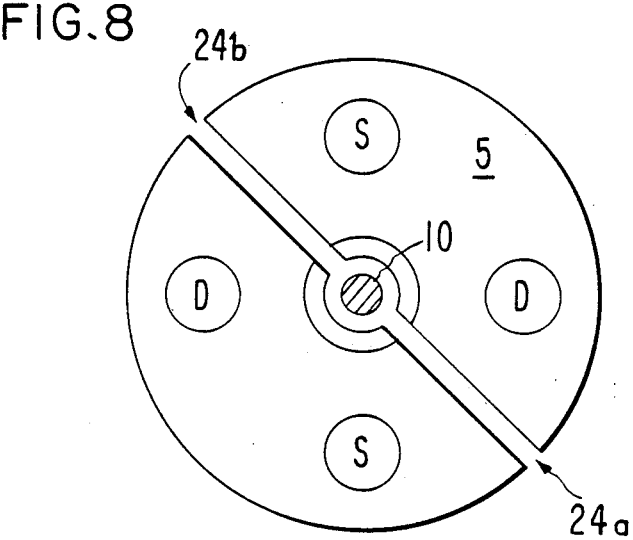

As pressure is applied through the control orifice 20 by pressure regulator 7, hydraulic oil enters passageways 22a and 22b to chamber 22 as in FIGS. 1 and 5. This hydraulic pressure causes control piston 12 to restrict movement to the right when viewing FIG. 2.

Such movement blocks the annular recesses in the outer surface of piston 12 and progressively both the discharge and suction sides of the pump. Chamber 13 which contains the return spring is vented through vents 14a and 14b to the atmosphere. The increase load on the pump causes an increase in torque to be applied to the pump body 4. Because the valve body 5 is rigidly attached to the pump body this torque is applied in varying amounts as a function of the movement of piston 12 to the valve body 5, and this causes rotation of the output shaft 26 since shaft 26 is rigid to valve body 5.

Should the pressure applied by the pressure regulator 7 be sufficient to slide the control valve far enough to completely restrict the suction and discharge sides of the pump, the pump will be under a hydraulic lock which causes the entire unit to rotate as a single shaft.

Plugs 16a, 16b, 17a, 17b, 21a, 21b, 23a and 23b are sealed plugs which are necessary because of machining techniques. Plug 11 seals the control valve 12 chamber.

The purpose of the relief valve 8 is to protect the pump from damage under excessive loads. Section E shows how the pressure from the discharge side of the pump is applied to relief piston 9 of FIG. 2. Should the pressure become higher than that at which it is set, the relief piston 9 will lift allowing the pressure to be returned to the suction side of the pump as shown in section D. Chamber 10 of the relief valve 8 vents to the atmosphere through passageways as shown in section F and FIG. 2. Plug 7 compresses the relief valve spring for proper setting.

The pump impeller, pump body 4 and the valve body all are designed, machined and assembled in such a way as to be a balanced system at operational rpm whether the valve body 5 is rotating or not. This means that the relief valve B and the control piston 12 have to be on the exact center line of rotation of the pump-valve body unit.

In this configuration there are four main seals 25 which maintain the hydraulic oil in the proper channels. The external (after the control valve 12) pressures are minimal where as the internal (between the pump and control valve 12) hydraulic pressures are higher.

The suction 18 and discharge 19 of housing 15a and 15b held in place by its pressure connections and ridges are on the valve body 5 which ride under each of the seals 25. Additional stabilizers can be added if needed (not shown).

I claim:

1. Apparatus for coupling a pair of shafts together comprising:
    an elongated member having a central axis and a first, driven shaft rigid thereto at one end thereof, the first shaft being coextensive with the central axis of the member;
    means mounting the member for rotation about said central axis;
    means defining a fluid passage through the member;
    means coupled with the member mounting means for coupling the fluid passage to a reservoir;
    means across said passage for pumping fluid from the reservoir through the passage and back to the reservoir, said pump adapted to be coupled to a second drive shaft;
    a control piston in and coaxial with the member and movable in opposed directions to the member, the control piston being movable in one direction for progressively blocking the passage and thereby for varying the volume rate of flow of fluid through the passage, there being a spring biasing the control piston in the opposite direction; and
    fluid means adapted to be coupled to the mounting means for controlling the movement of said control piston in said one direction relative to the passage, whereby the torque output of the first shaft can be varied for a given torque input at the second shaft.

2. Apparatus as set forth in claim 1, wherein is included means coupled with the member for providing a relief valve responsive to fluid pressure in said passage.

3. Apparatus as set forth in claim 1, wherein said passage includes a suction portions and a discharge portion, and wherein is included a relief valve in the member for coupling the suction portion to the discharge portion in response to a pressure in the passage in excess of a predetermined value.

4. Apparatus as set forth in claim 3, wherein said relief valve includes a movable plug within the member, said plug being in a bore which is in fluid communication with the suction and discharge portions of the passage when the plug is in an open position, and means biasing the plug toward a closed position.

5. Apparatus as set forth in claim 4, wherein said bias means includes a coil spring in the bore.

6. Apparatus as set forth in claim 1, wherein said control piston is cylindrical and is provided with a cylindrical outer surface, said recess being in the outer surface thereof.

7. Apparatus as set forth in claim 1, wherein the passage includes a suction portion and a discharge portion, said control piston having a recess for each of said portions, respectively, the recesses being progressively closed as the control piston moves in one direction axially of said member.

8. In combination:
    a first, driving shaft;
    a second, driven shaft;
    a tubular support;
    an elongated member having a central axis and having said second shaft rigid thereto at one end thereof, the second shaft being coextensive with the central axis of the member, said support having means mounting the member for rotation about such central axis, said member having a fluid passage therethrough, said fluid passage having a suction portion and a discharge portion;
    means coupled with the support for coupling the fluid passage to a reservoir;
    means coupled with said first shaft for pumping fluid from the reservoir, through the passage and back to the reservoir, said member having a bore coaxial therewith;
    a control piston in the bore and movable coaxially and relative thereto, said control piston having a pair of axially spaced, annular recesses in the outer surface thereof, said recesses forming spaced parts of said fluid passage, said control piston being movable in one direction for progressively blocking the recesses and thereby for varying the volume rate of flow of fluid through the passage, there being a spring biasing the control piston in the opposite direction relative to the passage; and
    means coupled with the member for providing a relief valve coaxial with the member and responsive to fluid pressure in the passage.

9. In combination as set forth in claim 8, wherein the relief valve is in a position to couple the suction portion to the discharge portion in response to a pressure in the passage in excess of a predetermined value.

10. Apparatus as set forth in claim 8, wherein said control piston is cylindrical and is provided with a cylindrical outer surface, said recess being in the outer surface thereof, said recess forming part of the passage when the recess is at least partially open.

* * * * *